United States Patent
Desai et al.

(10) Patent No.: US 10,237,898 B2
(45) Date of Patent: Mar. 19, 2019

(54) ARRANGEMENT FOR CONCURRENT DETECTION OF SIGNALS IN A RECEIVER

(71) Applicant: Intel IP Corporation, Santa Clara, CA (US)

(72) Inventors: Prasanna Desai, Elfin Forest, CA (US); Anthony Tsangaropoulos, San Carlos, CA (US)

(73) Assignee: Intel IP Corporation, Santa Clara, CA (US)

( * ) Notice: Subject to any disclaimer, the term of this patent is extended or adjusted under 35 U.S.C. 154(b) by 80 days.

(21) Appl. No.: 15/252,707

(22) Filed: Aug. 31, 2016

(65) Prior Publication Data

US 2018/0063873 A1 Mar. 1, 2018

(51) Int. Cl.
| | | |
|---|---|---|
| *H04W 4/00* | (2018.01) | |
| *H04W 76/10* | (2018.01) | |
| *H04L 5/00* | (2006.01) | |
| *H04L 12/24* | (2006.01) | |
| *H04B 1/00* | (2006.01) | |
| *H04W 4/80* | (2018.01) | |

(52) U.S. Cl.
CPC .......... *H04W 76/10* (2018.02); *H04B 1/0067* (2013.01); *H04L 5/0048* (2013.01); *H04L 41/12* (2013.01); *H04W 4/80* (2018.02)

(58) Field of Classification Search
CPC .... H04W 76/02; H04W 76/10; H04L 5/0048; H04L 41/12; H04B 1/0067
USPC .......................................................... 370/329
See application file for complete search history.

(56) References Cited

U.S. PATENT DOCUMENTS

| | | | | |
|---|---|---|---|---|
| 6,397,051 | B1 * | 5/2002 | Abbasi | H03D 7/18 455/207 |
| 6,677,882 | B1 | 1/2004 | Wedel | |
| 7,006,451 | B2 | 2/2006 | Kuwahara | |
| 8,275,314 | B1 | 9/2012 | Lin et al. | |
| 8,503,958 | B2 * | 8/2013 | Carrera | H04B 1/0085 455/188.1 |
| 2002/0004375 | A1 * | 1/2002 | Spencer | H04B 7/0811 455/277.1 |
| 2010/0091688 | A1 | 3/2010 | Staszewski | |
| 2010/0265875 | A1 * | 10/2010 | Zhao | H04B 1/0007 370/316 |
| 2015/0091907 | A1 * | 4/2015 | Martiny | G06T 11/206 345/428 |
| 2015/0288532 | A1 * | 10/2015 | Veyseh | H04L 12/283 370/310 |

OTHER PUBLICATIONS

International Search Report dated Oct. 12, 2017 in connection with International Application No. PCT/US017/044087.

\* cited by examiner

*Primary Examiner* — Sai Ming Chan
(74) *Attorney, Agent, or Firm* — Eschweiler & Potashnik, LLC (57) ABSTRACT

An arrangement for detection of multiple signals concurrently is disclosed. The arrangement includes a demodulator component, a mixer and a detector. The demodulator component is configured to demodulate or obtain one or more components from a received signal. The mixer is configured to mix the one or more components into a folded signal using a plurality of varied local oscillator (LO) signals. The detector is configured to identify a valid signal within the folded signal and to initiate a response for the identified valid signal.

20 Claims, 7 Drawing Sheets

ARRANGEMENT FOR CONCURRENT DETECTION OF SIGNALS IN A RECEIVER

FIELD

The present disclosure relates to wireless communication, including detection of multiple signals.

BACKGROUND

Mobile and wireless communications generally involve a sender or transmitter and a receiver. The sender generates and transmits a signal on a channel, which is a range of frequencies. The receiver receives and processes the signal from the channel.

However, there are situations where multiple senders exist. Each sender generates and transmits a signal, typically on a different channel. As a result, there are multiple transmitted signals on a plurality of channels. Typically, the receiver can only receive one signal at a time, so all but one of the transmitted signals can be missed.

One technique to overcome this is for the receiver to have multiple receive paths in order to receive and process the multiple transmitted signals. However, having multiple receive paths is costly. Additionally, it is not always known how many signals are transmitted, thus the number of receive paths may not be sufficient.

What is needed are techniques to receive multiple signals at a single receiver.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Transmitted signals are generated by a transmitter/sender for a variety of purposes and devices. Many transmitted signals are time sensitive in that they are generated and require a response/reaction by a receiving device within a relatively short period of time in order to be useful. The receiving device can include, mobile devices, user equipment (UE) and the like. The response/reaction can include establishing a data connection between a receiving device and the sender, requesting additional information and the like. As an example, transmitted signals may be location dependent. Thus if a mobile device moves out of the range of a sender before its signal can be detected, communication of information can be missed. The missed or time sensitive information can include, for example, advertisement information, traffic information and the like.

In one example, multiple advertisers may provide related information via a plurality of wirelessly transmitted signals on a plurality of channels. A device could monitor all of the plurality of channels so that the signals can be detected. Doing so permits users to be informed of sales and react by, for example establishing bi-directional communication.

In another example, a plurality of senders utilize Bluetooth low energy (BLE) applications, such as BLE advertisement packets. These senders generally require relatively fast reaction times by mobile devices to received BLE advertisement packets.

One technique to handle the multiple signals on multiple channels is for a receiving device to include multiple receive chains or paths that independently receive and process a signal. Thus, the multiple receive paths can receive and process the multiple signals concurrently. As a result, the receiving device can be informed of the multiple signals, such as advertisements, from the multiple senders simultaneously and react and/or respond to the received signals. However, using multiple receive paths is costly to implement and consume relatively large amounts of power.

Another technique is to utilize a scan window wherein each channel is scanned for a signal for a duration of time before moving on to a next channel. Eventually, a generated signal for a channel may coincide with a scan of that channel and be received by the receiving device. The receiving device could then react and, for example, establish a connection. However, while one channel is being scanned, the other channels are not and signals can be missed. Additionally, by waiting for its turn, a signal can be detected too late and, as a result, the response or reaction to the signal can be too late.

The arrangements and embodiments below permit concurrent detection by a device of multiple signals on multiple channels without requiring a receive path for every channel or signal. The device can then respond or react to the multiple signals with a time sensitive or relatively short period. In one example, the response time is within hundreds of microseconds. A plurality of local oscillator (LO) signals are used to convert multiple RF signals/channels onto a single frequency of interest (IF, Intermediate Frequency) signal. This effect is similar to "folding" signals from multiple channels into a single signal, which can then be monitored in a more hardware-efficient manner to detect a presence of signals on the channels and react or respond to a detected signal.

Figure 1:
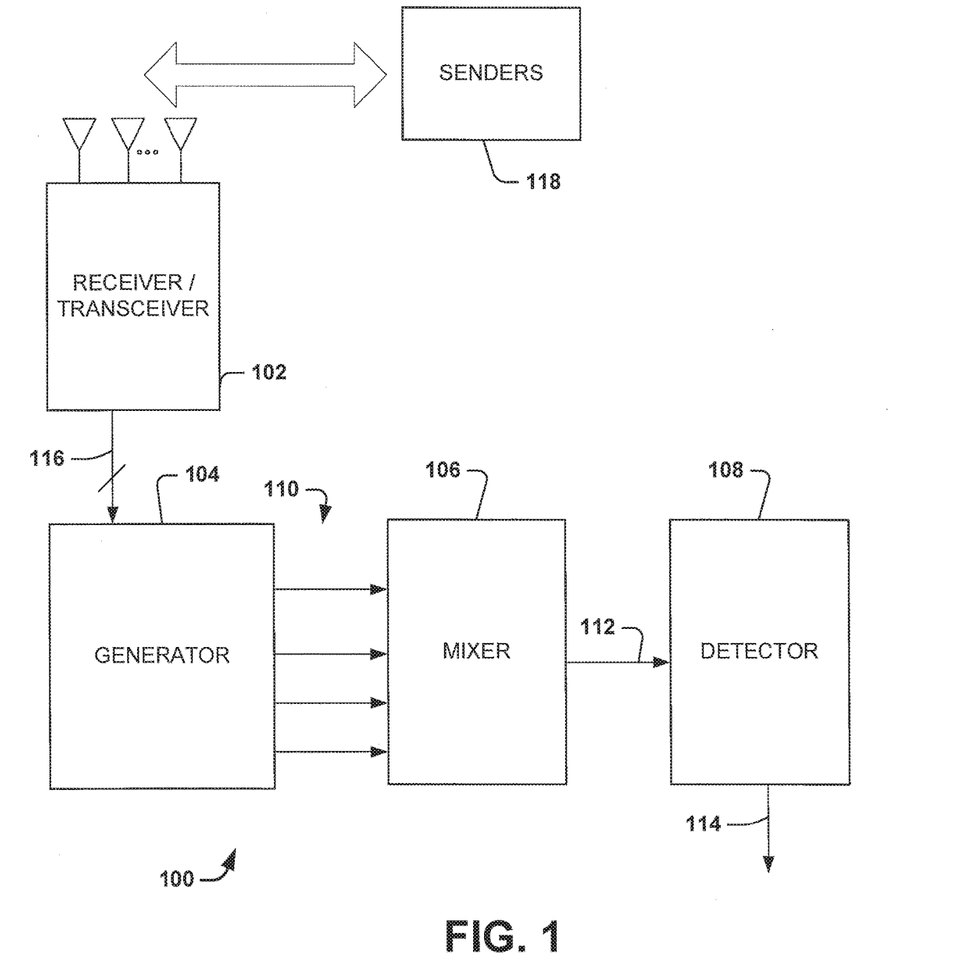
FIG. 1 is a diagram illustrating an arrangement for concurrent detection of signals.

FIG. 1 is a diagram illustrating an arrangement 100 for concurrent scans of multiple channels in a wireless receiver. The arrangement 100 can also be used for multiple modes of communication and/or communication types. The arrangement 100 is provided in a simplified format for illustrative purposes. It is appreciated that other components can be included.

The arrangement 100 includes a receiver 102, a component 104, a mixer/combiner 106 and a detector 108. It is appreciated that the arrangement 100 can include other components, including other logic and circuitry. The arrangement 100 can be incorporated into a device, such as a mobile device, user equipment (UE) and the like.

The arrangement can include one or more other components including, but not limited to, amplifiers, low noise amplifiers, frequency stages, filters, data recover stages and the like. The low noise amplifiers can be used to amplify received signals. The filters can remove unwanted portions of the received signals, including attenuating out of band signals.

The transceiver 102 is configured to send and receive signals via one or more antenna. For illustration, the transceiver 102 is described as receiving signals and is configured to receive a composite signal 116 using the one or more antenna. The one or more antenna can be configured as an array. The composite signal 116 includes a plurality of signals on a plurality of channels or bands. In one example, the composite signal 116 includes three signals on three different channels. The plurality of channels, further described below, include distinct frequency bands or frequency ranges. The plurality of channels and signals can be in accordance with a standard, such as BLE, IEEE802.15.4, ANT, IEEE802.11, WiFi, Zigbee, Bluetooth classic and the like.

A plurality of transmitters/senders 118 are configured to generate the plurality of signals on the plurality of channels that are included in the composite signal 116. The senders 118 include communication devices, network devices, computers, processor based devices, user equipment (UE) and the like. The senders 118 can include advertisers, traffic information providers and the like.

The senders 118 can utilize various wireless communication types or standards including, but not limited to, Bluetooth classic, Bluetooth low energy (BLE), IEEE802.15.4, ANT, IEEE802.11, WiFi, and the like. In one example, the signals 110 are in the industrial, scientific and medical (ISM) bands, such as at about 2.4 GHz. It is appreciated that use of other communication types and/or standards is contemplated. Further, it is appreciated that one or more of the plurality of channels can omit a signal.

In one example, the plurality of channels include three BLE advertising channels and one Zigbee (ZB) channel. The three BLE channels are at 2402 MHz, 2426 MHz and 2480 MHz. The Zigbee channel, for example IEEE 802.15.4, is at 2405 MHz, 2410 MHz, 2480 MHz and the like.

In another example, the one or more senders generate the plurality of signals are generated during an event window wherein individual signals can occur for a portion of the event on one of the channels. The event has a start time and a close time.

The component generator 104 is configured to convert the signal 116 into a multiple or plurality of signals or signal components 110 for the plurality of channels. In one example, the generator 104 is a quadrature generator and generates inphase (I) and quadrature (Q) components 110 from the composite signal 116. In another example, band or channel specific components are generated for each channel or band of the plurality of channels.

The mixer and/or combiner component 106 is configured to fold or combine the components 110 from the plurality of channels into a single folded signal 112. The mixer 106 downconverts/mixes the components 110 using local oscillator (LO) signals and then combines the mixed signals into the combined or folded signal 112.

In one example a separate local oscillator (LO) signal is used for each of the plurality of channels. Each LO signal is at a selected frequency that corresponds to one of the plurality of channels. The LO signals are mixed with the components 110 into a plurality of mixed signals/components. The mixed signals are then combined into the folded signal 112 using summation components and passed through an analog to digital converter. The summation components and the converter can be part of or in addition to the mixer 106. The folded signal 112 is provided at an output of the mixer 106.

The detector 108 is configured to analyze the folded signal 112 and determine/detect if a matching signal is present or identified during a duration or event window. The matching signal is a signal that meets one or more criteria, such as, being associated with a particular transmitter/sender, is within a selected location, includes a valid BLE advertisement, within a channel, within one of the plurality of channels, has a selected modulation, is valid, has a power level above a threshold value, has a selected communication type and the like. It is appreciated that more than one matching signal can be detected.

A valid signal is an example of the signal that matches criteria, for example a power level above a threshold value on a selected channel and using a selected communication type.

Once the matching signal is identified a suitable response is provided and/or generated. In one example, the suitable response includes establishing a connection with an associated transmitter/sender of the senders 118, sending a signal to the associated transmitter/sender, and the like. In another example, the response includes entering a high performance mode or high duty cycle scan. Thus, the arrangement 100 can be configured to stay in a low power mode until the transfer into the high performance mode, thereby mitigating power consumption. In yet another example, an upper layer, such as a firmware layer, is notified that there is an active BLE transmitter in the area.

The suitable response is provided within a period of time referred to as a response time. The response time or expected response time can be relatively long, such as one or more micro seconds (ms). For example, BLE signals permit a response time of about 150 ms whereas IEEE 802.15.4 allows about 192 ms.

Figure 2:
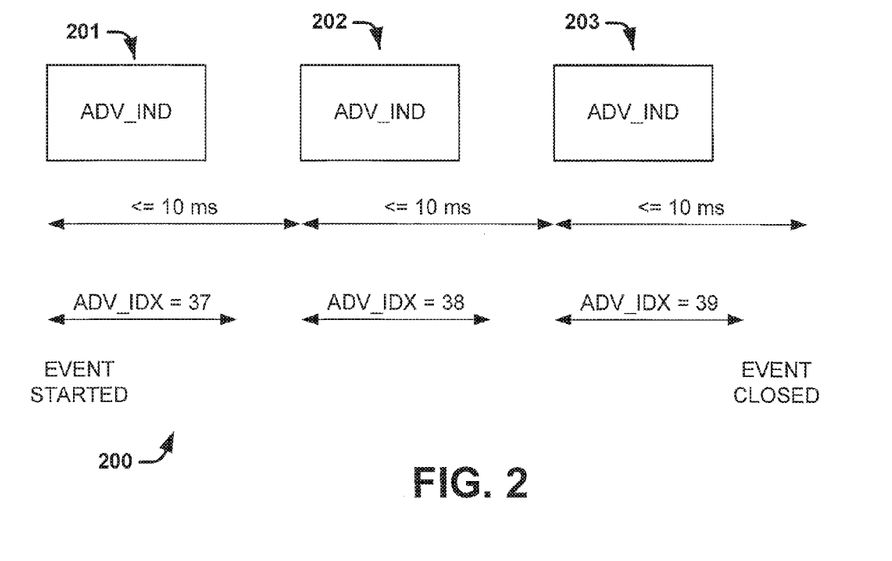
FIG. 2 is a diagram illustrating an example of advertising signals that can be received at a receiver arrangement.

FIG. 2 is a diagram 200 illustrating an example of a BLE advertising cycle. The diagram 200 shows signals that can be received at a BLE receiver arrangement. The receiver arrangement, in one example, is the arrangement 100 of FIG. 1. It is appreciated that the example signals are provided for illustrative purposes and that suitable variations are contemplated.

The diagram 200 includes a plurality of advertising signals which occur during an event or event window. The event window has a start time and an end time or close time in which one or more signals can be generated on a plurality of channels. In one example, the event has a duration of about 30 ms between a start and close of the event.

The advertising signals can be included in the plurality of signals described above and are generated by a transmitters/senders, such as one of the senders 118. The advertising signals include a first signal 201, a second signal 202 and a third signal 203.

Each of the advertising signals operates at a different frequency or channel. Thus, the first signal 201 is at a first channel or frequency, the second signal 202 is at a second channel and the third signal 203 is at a third channel. Further, each signal has an index and duration. Here, the index for the first signal 201 is 37, the index for the second signal 202 is 38 and the index for the third signal 203 is 39. The signals have a duration or length less than or equal to 10 ms. The index can be provided with the signals and identify the transmitter or sender of the signals or provide some other information associated with the signals and/or the sender.

It is noted that the event starts with the first signal 201 and closes at the end of the third signal 203, in this example. The event, in this example, can also be referred to as an advertising event where the signals 201, 202 and 203 are advertising signals.

The arrangement 100 can be utilized to concurrently scan the channels, including the first, second and third channels using a low power mode or low duty cycle. The arrangement 100 can detect or identify one or more of the signals 201, 202 and 203 as a matching signal and provided a suitable response.

Figure 3:
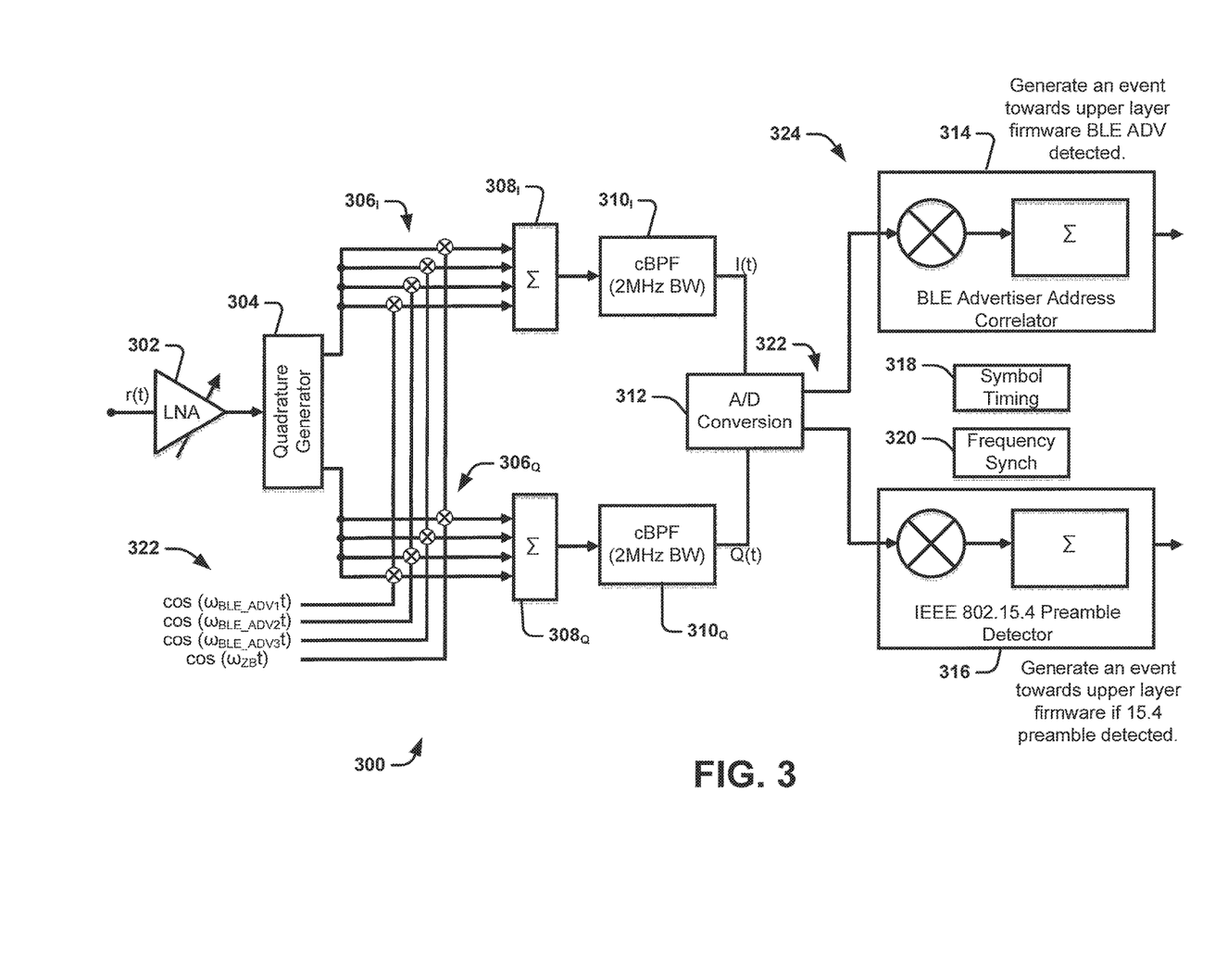
FIG. 3 is a diagram illustrating an arrangement for concurrent detection of signals.

FIG. 3 is a diagram illustrating an arrangement 300 for concurrent detection of signals in a wireless receiver. The arrangement 300 concurrently scans a plurality of channels and generates a response or event for detected matching signals. The arrangement 300 can also be used for multiple modes and/or communication types. The arrangement 300 is similar to the arrangement 100 and includes extra detail.

The arrangement 300 includes an amplifier 302, a quadrature generator 304, mixers 306, summation components 308, filters 310, an analog to digital (A/D) conversion component 312, an address correlator 314, a preamble detector 316, a symbol timing component 318 and a frequency synchronization component 320. It is appreciated that other logic, circuitry and/or components can be included in the arrangement 300.

The amplifier 302 receives and amplifies a received signal r(t). The amplifier 302 is an adjustable gain, low noise amplifier (LNA). The received signal includes a plurality of signals using a plurality of channels or frequency bands. The plurality of signals can include various wireless communication types or standards including, but not limited to, Bluetooth classic, Bluetooth low energy (BLE), IEEE802.15.4, ANT, IEEE802.11, Wifi, and the like. In one example, the signals are in the industrial, scientific and medical (ISM) band, such as at about 2.4 GHz. In another example, the signals shown in FIG. 2 are included with the received signal r(t).

The plurality of signals in the received signal r(t) are generated by one or more senders, such as the senders 118 of FIG. 1. The senders can generate respective signals within an event, as shown in FIG. 2. It is appreciated that the received signal r(t) can omit signals from some of the senders and/or the plurality of channels.

The quadrature generator 304 is configured to generate an I component and a Q component from the received and amplified signal r(t). The quadrature component Q has a phase separated from the I component by 90 degrees ($\pi/2$). The components include components, including I and Q components, for each channel of the plurality of channels.

The mixers 306 include in phase mixers $306_I$ and quadrature mixers $306_Q$. In this example embodiment, there are four in phase mixers $306_I$ and four quadrature mixers $306_Q$.

The mixers 306 are configured to generate mixed signals by mixing/downconverting the components using a plurality of local oscillator (LO) signals 322. The mixed signals are provided to the summation components 308. In one example, the plurality of LO signals 322 includes fours signals having varied frequencies corresponding to the plurality of channels. In another example, shown in FIG. 3, the plurality of LO signals 322 correspond to a first BLE advertising channel, a second BLE advertising channel, a third BLE advertising channel and a Zigbee (ZB) advertising channel. In this example, the first, second and third BLE advertising channels are at frequencies or center frequencies of 2402 mega-Hertz (MHz), 2426 MHz and 2480 MHz, respectively. The ZB channel is at another frequency. Thus, each LO signal is at a frequency associated with a channel of the plurality of channels. It is appreciated that the plurality of channels can include other channels and frequencies including, for example, Bluetooth classic, Bluetooth low energy (BLE), IEEE802.15.4, ANT, IEEE802.11, WiFi, and the like.

Thus, the mixers 306 generate mixed and/or downconverted signals, one for each channel of the plurality of channels. In this example, there are 4 channels, thus 4 mixers $308_I$ for I components and 4 mixers $308_Q$ for the Q components that generate I and Q mixed signals for each channel.

The mixed signals are combined or summed by the summation component 308, which includes an in phase summation $308_I$ and a quadrature phase summation component $308_Q$. The in phase summation component $308_I$ adds mixed signals from the in phase mixers $306_I$ into a composite or cumulative in phase signal. The quadrature summation component $308_Q$ adds or combines mixed signals from the quadrature mixers $306_Q$ into a composite or cumulative quadrature signal. Although shown separately, the mixers 306 and the combiners 308 can be part of a single mixing component.

The channel select filters 310 are configured to select the channel(s) and remove unwanted channels and/or other signals. The channel select filters 310 can be complex band pass filters (cBPF). The channel select filters 310 include an in phase channel select filter $310_I$ and a quadrature channel select filter $310_Q$. The composite in phase signal is injected into the channel select filter $310_I$ and the composite quadrature signal is injected into the quadrature channel select filter $310_Q$.

BLE generally uses Gaussian frequency shift keying (GFSK) as a modulation method or offset quadrature phase shift keying (O-QPSK). Thus, a signal using BLE can be at about 1 Mbps while a ZB (IEE 802.15.4) can be at about 2 Mbps. The filters 310 are typically configured for the widest bandwidth of possible or expected signals, which in the above example, would be 2 Mbps.

If a valid signal is present on only 1 of 4 channels, that channel is typically at least approximately 6 decibels (dB) stronger than the other channels.

The A/D converter 312 is configured to generate digital output signal(s) 322 based on the filtered signals from the channel select filters 310. The signal 322 can also be referred to as a digital folded signal in that it includes the plurality of signals of the plurality of channels.

There are a plurality of detectors 324 that can utilize the signal 322 to detect or identify a matching signal in the output/folded signal 322. The detectors 324 generate a response based on the matching signal. The response can include, for example, establishing communication, switching from a low power or low duty cycle mode, generating an event, and the like. The matching can be based on an index, such as an advertiser index, presence of signal on a channel, an address, a sender identification, and the like. The detectors 324 include, as suitable examples, a BLE advertiser address correlator 314 and an IEE 802.15.4 preamble detector 316. It is appreciated that other correlators/detectors can be present.

The address correlator 314 is configured to detect and correlate addresses with a particular sender/transmitter. The correlator 314 includes a mixer and summation component that are configured to identify the presence of a signal from the folded signal 322 and correlate the identified signal with a particular sender. A suitable response includes generating an event towards an upper layer firmware upon detection of a signal from one of a group of senders. In one example, the group of senders include a first BLE advertiser (BLE_ADV1), a second BLE advertiser (BLE_ADV2) and a third BLE advertiser (BLE_ADV3).

In another example, the address correlator 314 is configured to obtain/identify an address from a signals within the output signal, which identifies or correlates the signal with a BLE advertiser.

The preamble detector 316 is configured to detect a preamble for a selected channel and/or communication type. In one example, the communication type is Zigbee. The preamble detector 316 generates an event, also referred to as a response, if a selected channel and/or a signal on the selected channel is detected. In one example, the event is generated if an IEEE 802.15.4 preamble is detected. In one example, the event or message is provided to an upper firmware layer.

The components 318 and 320 are configured to facilitate detection of signals by the detectors 324. The symbol timing component 318 is configured to adjust or synchronize timing for symbols in the digital output signal 322 provided by the A/D conversion component 312. The timing can be associated with one or more of the plurality of channels. The frequency synchronization component 320 is configured to adjust or synchronize frequencies in the digital signal 322 provided by the A/D conversion component 312. The frequencies can be associated with one or more of the plurality of channels.

Thus, the arrangement 300 provides concurrent scanning for the plurality of signals on the plurality of channels.

In one variation, peak detectors (not shown) can be included on each path between the mixers 306 and the summation components 308. The peak detectors fire or otherwise indicate the presence of a signal on their associated path. The presence of the signal for an associated channel is determined by which of the peak detectors fire.

Figure 4:
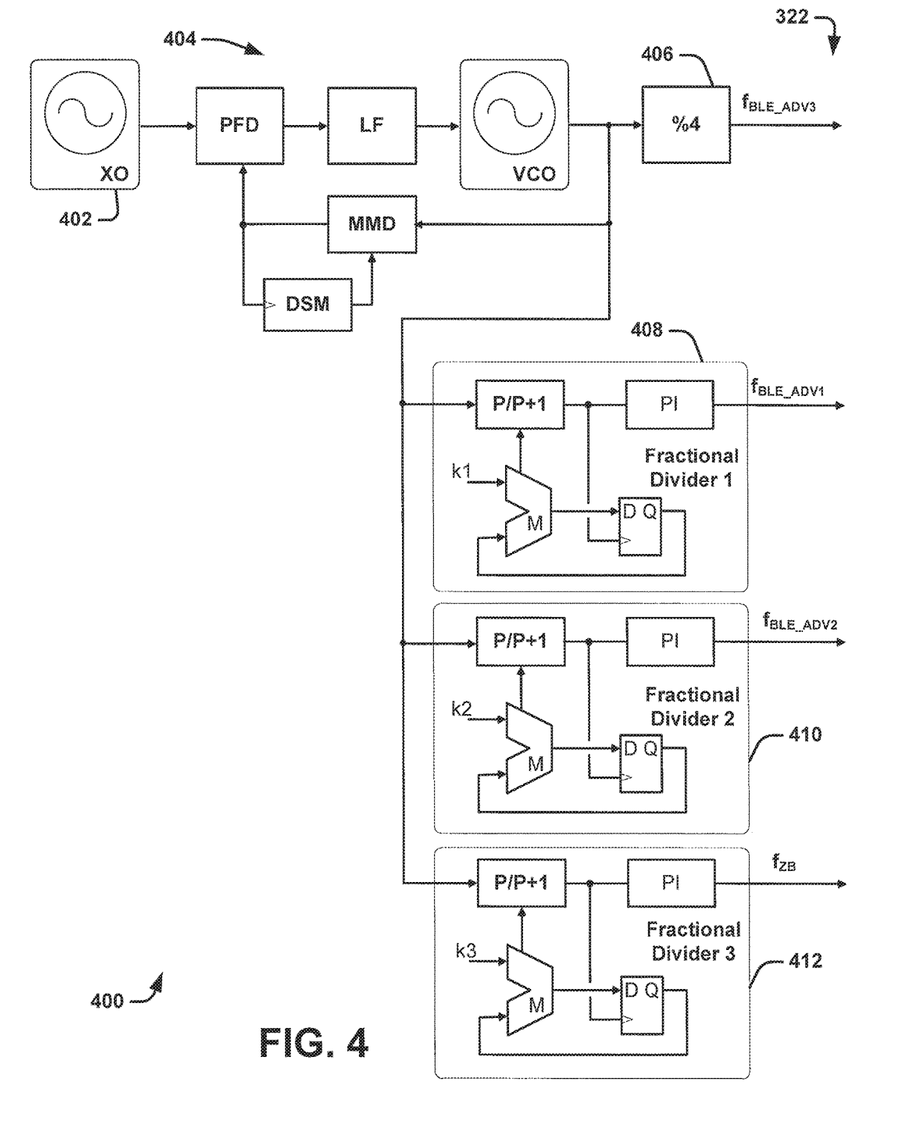
FIG. 4 is a diagram illustrating a local oscillator (LO) signal generator.

FIG. 4 is a diagram illustrating a local oscillator (LO) signal generator 400. This LO signal generator 400 is based on a phase locked loop (PLL) and generates four LO signals by employing fractional division techniques, however it is appreciated that variations are contemplated that can generate other numbers of LO signals. The signal generator 400 can be used with the arrangements 100, 300 and variations thereof.

The LO generator 400 includes a reference frequency generator 402, a voltage controlled oscillator (VCO), a multi-modulus divider (MMD) with a Delta-Sigma Modulator (DSM), a Phase-Frequency Detector, and charge pump (PFD), a phase locked loop (PLL) 404, a first divider 406, a second divider 408, a third divider 410 and a fourth divider 412.

The frequency generator 402 includes a crystal or other frequency generating element and is configured to generate a default frequency. The PLL 404 generates a VCO signal using feedback and a number of components. The PLL 404 includes a phase frequency detector (PF), a loop filter (LF), a voltage controlled oscillator (VCO), a multi-modulus divider (MMD) and a delta sigma modulator (DSM).

The PLL 404, which includes the PFD, LF, VCO and MMD, is configured to generate the VCO signal ($f_{MLO}$), which is a multiple of a highest frequency of a plurality of channels. The VCO signal is also referred to as a master LO frequency.

The first divider 406 is configured to divide the VCO signal to generate a first LO signal. In this example, the first divider 406 divides the VCO frequency by 4.

The second divider 408 is configured to divide the PLL frequency by a non-integer (fractional) ratio to generate a second LO signal. The second divider 408 includes a dual modulus divider (P/P+1), a phase interpolator (PI), an accumulator (M) and a synchronizing element (such as a D-Flip-Flop). The accumulator increment k1, controls the fractional division ratio 408.

The third divider 410 and fourth divider 412 are operate substantially similar to divider 408 and produce additional LO signals.

The plurality of LO signals 322 include the first LO signal, the second LO signal, the third LO signal and the fourth LO signal. The plurality of LO signals 322 can be used, for example, as the LO signals 322 shown in FIG. 3 for the arrangement 300.

In one example, the plurality of LO signals 322 include three LO signals for advertising signals using BLE and another signal using Zigbee as shown in FIG. 4. The first divider generates the first LO signal ($f_{BLE\_ADV3}$) at a frequency of 2480 Mhz. The second divider generates the second LO signal ($f_{BLE\_ADV1}$) at a frequency of 2426 MHz. The third divider generates the third LO signal ($f_{BLE\_ADV2}$) at a frequency of 2410 MHz. The fourth divider generates the fourth LO signal ($f_{ZB}$) at a frequency of 24050 MHz. MHz. The frequencies shown are for illustrative purposes only and it is appreciated that LO signals at other frequencies are contemplated. It is also appreciated that other suitable techniques can be used to generate the LO signals.

Figure 5:
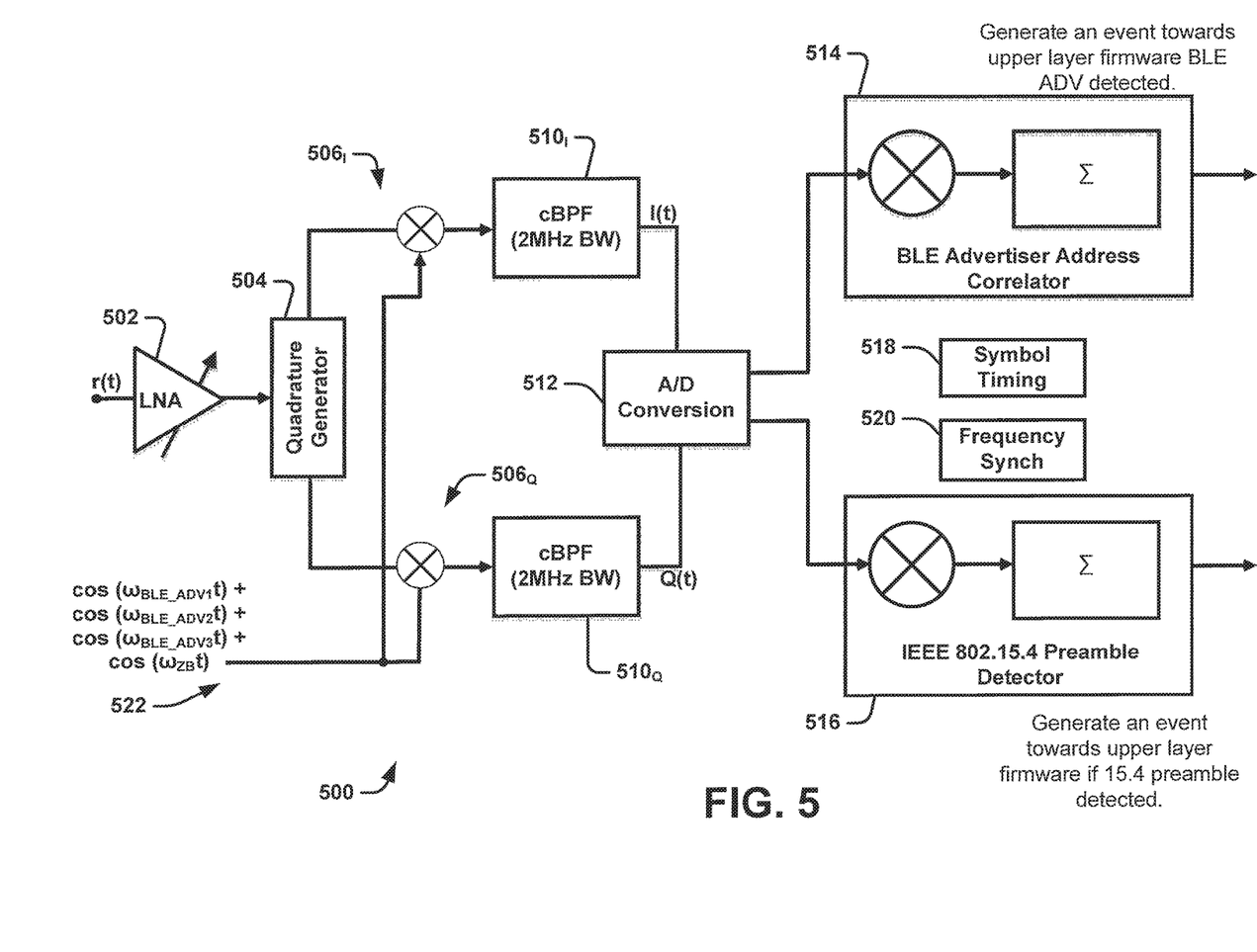
FIG. 5 is a diagram illustrating an arrangement for concurrent detection of signals.

FIG. 5 is a diagram illustrating an arrangement 500 for concurrent detection of signals in a wireless receiver. The arrangement 500 is similar to the arrangement 300, described above. However, the arrangement 500 uses two mixers. Additional description of similarly named components is provided above with regard to FIG. 3.

The arrangement 500 includes an amplifier 502, a quadrature generator 504, mixers 506, channel select filters 510, an analog to digital (A/D) conversion component 512, an address correlator 514 and a preamble detector 516. It is appreciated that other logic, circuitry and/or components can be included in the arrangement 500.

The amplifier 502 receives and amplifies a received signal r(t) from an antenna or antenna array. The amplifier 502 is a low noise amplifier (LNA) and has an adjustable gain. The signal r(t) includes a plurality of signals on a plurality of channels from one or more senders. The plurality of signals can include various wireless communication types or standards including, but not limited to, Bluetooth classic, Bluetooth low energy (BLE), IEEE802.15.4, ANT, IEEE802.11, Wifi, Zigbee (ZB) and the like. In one example, the signals are in the industrial, scientific and medical (ISM) band, such as at about 2.4 GHz. In another example, the signals shown in FIG. 2 are included with the received signal r(t).

The quadrature generator 504 is configured to generate an I component and a Q component from the received and amplified signal r(t). The quadrature component Q has a phase separated from the I component by 90 degrees ($\pi/2$).

The mixers 506 include an in phase mixers $506_I$ and a quadrature mixer $506_Q$. In this example embodiment, there is only the one in phase mixers $506_I$ and the one quadrature mixer $506_Q$.

The mixers 506 are configured to generate mixed signals by mixing/downconverting the components using a single wire multiple frequency local oscillator (LO) signal 522. The mixed signals are provided to the summation components 508. The LO signal 522 is generated, in one example, using a single PLL and three fractional dividers that produce LO signals as in FIG. 4. The produced LO signals can be mixed with the PLL output to create a composite output signal that is used at the mixers 506. The composite output signal is the LO signal 522. In this example, the produced LO signals include a plurality of frequencies corresponding to a plurality of channels. In one example, the plurality of frequencies correspond to a first BLE advertising channel, a second BLE advertising channel, a third BLE advertising channel and a Zigbee (ZB) advertising channel.

The mixed signals are also composite or cumulative signals, which are then provided to channel select filters. The composite signals include an in phase composite signal and a quadrature composite signal. The channel select filters 510 are configured to select the channel(s) and remove unwanted channels and/or other signals. The channel select filters 510 include an in phase channel select filter 510, and a quadrature channel select filter $510_Q$. The composite in-phase signal is injected into the channel select filter $510_I$ and the composite quadrature signal is injected into the quadrature channel select filter $510_Q$.

The A/D conversion component 512 is configured to generate output signals based on the filtered signals from the channel select filters 510.

The address correlator 514 is configured to detect and correlate addresses with a sender or transmitter. In one example, the sender is an advertiser. The address correlator 514 generate an event upon a selected channel or signal being detected. In one example, the event is sent to an upper layer of firmware.

The preamble detector 516 is configured to detect a preamble for a selected channel and/or communication type. In one example, the communication type is Zigbee. The preamble detector 516 generates an event if a selected channel is detected. In one example, the event is provided to an upper firmware layer.

The symbol timing component 518 is configured to adjust or synchronize timing for symbols in the digital signals provided by the A/D conversion component 512. The frequency synchronization component 520 is configured to adjust or synchronize frequencies in the digital signals provided by the A/D conversion component 512.

Figure 6:
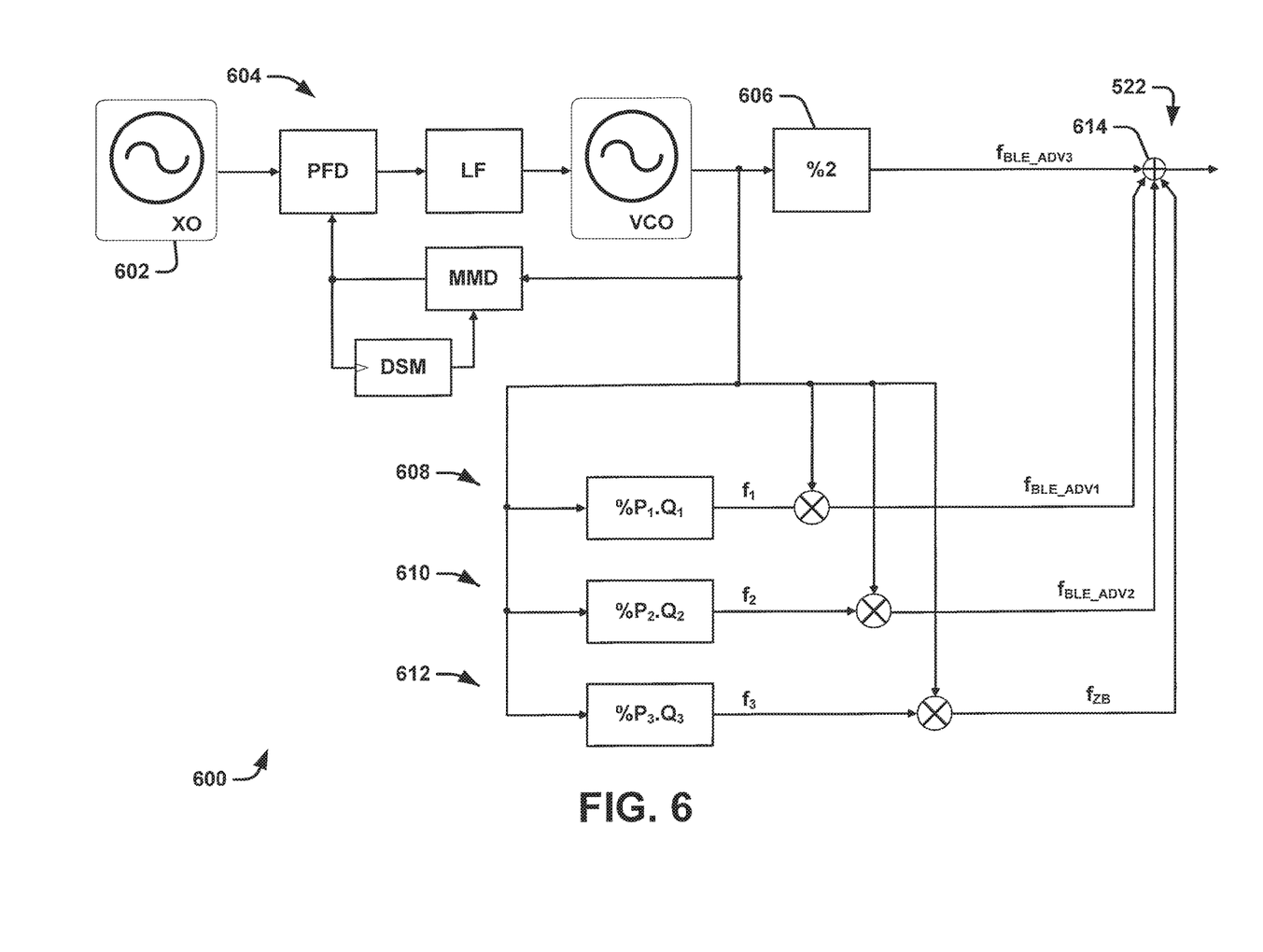
FIG. 6 is a diagram illustrating a local oscillator (LO) signal generator configured to generate a single wire, multi frequency LO signal.

FIG. 6 is a diagram illustrating a local oscillator (LO) signal generator 600 configured to generate a single wire, multi frequency LO signal. This LO signal generator 600 an LO signal having four frequencies, however it is appreciated that variations are contemplated that can generate LO signals including other frequencies. The signal generator 600 can be used with the arrangement 500 and variations thereof.

The LO generator 600 includes a frequency generator 602, a phase locked loop (PLL) 604, a first divider 606, a second divider 608, a third divider 610, a fourth divider 612 and a multi-frequency combiner 614.

The frequency generator 602 includes a crystal or other frequency generating element and is configured to generate a reference frequency. The PLL 604 generates a VCO signal using feedback and a number of components. The PLL 604 includes components such as a phase frequency detector (PFD), a loop filter (LF), a voltage controlled oscillator (VCO), a multi-modulus divider (MMD) and a delta sigma modulator (DSM).

The PLL 604 is configured to generate a LO signal at a frequency ($f_{MLO}$) as a multiple of a highest of a plurality of channels. The generated LO ($f_{MLO}$) signal is also referred to as the master local oscillator (MLO) signal.

The PLL output signal ($f_{MLO}$) is then passed through a fixed frequency divider 606 to generate a first LO signal $f_{BLE\_ADV3}$. In this example, the first divider 606 divides the VCO frequency by 2.

The second divider 608 includes an accumulator arrangement and phase interpolator as described above and is configured to fractionally divide the PLL output signal ($f_{MLO}$) by an integer division ratio of $P_1$ and a fractional division ratio of $Q_1$ to generate a signal of frequency $f_1=f_{MLO}/[P_1 \cdot Q_1]$. This intermediate signal is then mixed with $f_{MLO}$ to produce a second LO signal $f_{BLE\_ADV1}=f_{MLO}(1-1/[P_1 \cdot Q_1])$. A low pass filter may also be used to reject the high side mixing product ($f_{MLO}(1+1/[P_1 \cdot Q_1])$).

The third divider 610 is configured to fractionally divide the PLL signal $f_{MLO}$ to generate a third LO signal in a similar fashion as divider 608. The third LO signal is generated by mixing the divider 610 output with the PLL signal $f_{MLO}$ and has a frequency $f_2=f_{MLO}/[P_2 \cdot Q_2]$, which is then mixed with the PLL signal $f_{MLO}$ to yield a third LO signal $f_{BLE\_ADV2}=f_{MLO}(1-1/[P_2 \cdot Q_2])$.

The fourth divider 612 is configured to fractionally divide the PLL signal $f_{MLO}$ to generate a fourth LO signal in a similar fashion as divider 608 and 610. The fourth LO signal is generated by mixing the divider 612 output with the PLL signal $f_{MLO}$ and has a frequency $f_3=f_{MLO}/[P_3 \cdot Q_3]$, which is then mixed with the PLL signal $f_{MLO}$ to yield a third LO signal $f_{ZB}=f_{MLO}(1-1/[P_3 \cdot Q_3])$.

The multi-frequency combiner 614 combiners the first LO signal, the second LO signal, the third LO signal and the fourth LO signal into single multi-frequency composite LO signal 522.

Figure 7:
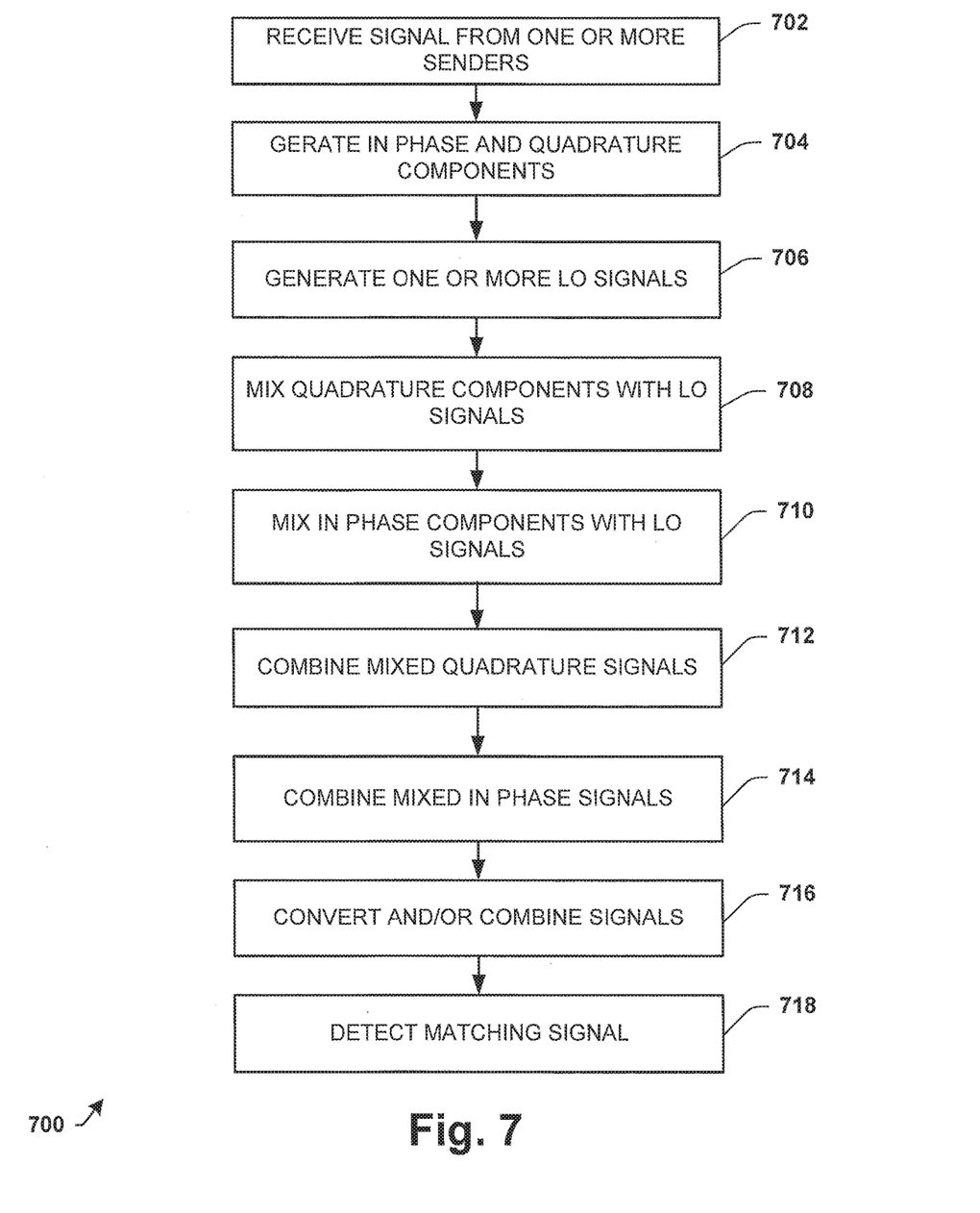
FIG. 7 is a flow diagram illustrating a method for concurrent detection of signals.

FIG. 7 is a flow diagram illustrating a method 700 for concurrent scanning a plurality of channels. The channels are scanned to detect the presents of signals. The method 700 utilizes a plurality of local oscillator (LO) signals to facilitate detection instead of using multiple distinct receive paths or receive chains.

A receiver or transceiver receives a signal at block 702. The received signal includes a plurality of signals from on a plurality of channels at a different frequencies or frequency bands. One or more senders generate the plurality of signals. An example of a suitable receiver is the transceiver/receiver 102 described above. In one example, the one or more senders include advertisers and the like.

A quadrature generator creates or derives in phase and quadrature components from the received signal at block 704. An example of a suitable quadrature generator is the quadrature generator 304 described above.

A local oscillator (LO) generator generates the plurality of local oscillator (LO) signals at block 706. The one or more LO signals are generated based on the plurality of channels. Examples of suitable LO generators include the LO generator 400 and the LO generator 600, described above.

In one example, the LO signals are generated by creating a voltage controlled oscillator (VCO) signal at a selected frequency based on the one or more channels of the senders. Then, the VCO signal or master local oscillator (MLO) signal is divided to create the plurality of LO signals.

In another example, the plurality of LO signals are combined into a single LO signal, as described above.

One or more quadrature mixers mix or downconvert the quadrature components with the plurality of LO signals to generate one or more mixed quadrature signals at block 708. Examples of suitable mixers are shown as mixers 306$_Q$ in FIG. 3 and in 506$_Q$ in FIG. 5.

One or more in phase mixers mix or downconvert the inphase component with the plurality of LO signals to generate one or more mixed inphase signals at block 710. Examples of suitable mixers are shown as mixers 306$_I$ in FIG. 3 and in 506$_I$ in FIG. 5.

A quadrature summation component folds or combines the one or more mixed quadrature signals into a folded quadrature signal at block 712. An example of a suitable component is the summation component 308$_Q$ shown in FIG. 3. Additionally, a channel select filter can be used to remove unwanted channels and or noise, such as the filter 310$_Q$.

An in phase summation component folds or combined the one or more mixed in phase signals into a folded in phase signal at block 714. An example of a suitable component is the summation component 308$_I$ shown in FIG. 3. Additionally, a channel select filter can be used to remove unwanted channels and or noise, such as the filter 310$_I$.

A converter combines the folded quadrature signal and the folded in phase signal into a folded signal at block 716. In one example, an A/D converter, such as the converter 312 of FIG. 3 is used to convert and combine the folded quadrature signal and the folded in phase signal in a digital, folded signal.

A detector concurrently scans the folded signal to detect/identify a valid signal on at least one of the plurality of channels and generates a suitable response at block 718. The detection/identification is also referred to as matching. The detector can include one or more detectors and/or correlators. In one example, the detector includes an address correlator and/or a preamble detector can be used to detect a selected or valid signal within the folded signal. The suitable response can include establishing a connection with a sender associated with the matching signal, generating an event, transitioning from a low power or low duty cycle mode, and the like.

Thus, the method 700 and suitable variations thereof can be utilized to concurrently scan a plurality of channels for a detected or matching signal. The plurality of channels can be scanned without requiring separate receive paths for each channel/signa. Once detected, a suitable response is generated.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an arrangement for concurrent scanning of a plurality of channels. The arrangement includes a generator component, a mixer and a detector. The generator component is configured to generate one or more signal components from a received signal, wherein the received signal includes the plurality of channels. The mixer is configured to mix and combine the one or more components into a folded signal using a plurality of varied local oscillator (LO) signals. The detector is configured to concurrently scan the plurality of channels by detecting a signal within the folded signal and to initiate a response for the detected signal.

Example 2 includes the subject matter of Example 1, including or omitting optional elements, where the arrangement further includes a LO signal generator configured to generate the plurality of LO signals.

Example 3 includes the subject matter of any of Examples 1-2, including or omitting optional elements, where the plurality of channels include Bluetooth low energy (BLE) and Zigbee (ZB).

Example 4 includes the subject matter of any of Examples 1-3, including or omitting optional elements, where the mixer includes four pairs of mixers, each pair configured to utilize one of the plurality of varied LO signals.

Example 5 includes the subject matter of any of Examples 1-4, including or omitting optional elements, where the arrangement includes a low noise amplifier configured to amplifier the received signal and provide the received signal to the generator component.

Example 6 includes the subject matter of any of Examples 1-5, including or omitting optional elements, where the generator component is a quadrature generator.

Example 7 includes the subject matter of any of Examples 1-6, including or omitting optional elements, where the mixer is configured to generate a plurality of mixed signals using the plurality of varied LO signals to downconvert the one or more components.

Example 8 includes the subject matter of any of Examples 1-7, including or omitting optional elements, where the mixer component includes a summation component configured to fold the plurality of mixed signals into the folded signal.

Example 9 includes the subject matter of any of Examples 1-8, including or omitting optional elements, where the plurality of varied LO signals are combined into a single, multi-frequency LO signal.

Example 10 includes the subject matter of any of Examples 1-9, including or omitting optional elements, where the detector includes an address correlator configured to identify a valid signal and associated address from the folded signal.

Example 11 includes the subject matter of any of Examples 1-10, including or omitting optional elements, where the detector includes a preamble detector configured to identify a valid signal based on a detected preamble of the folded signal.

Example 12 is an arrangement for generating a folded signal. The arrangement includes an oscillator component, a mixing component, a channel select filter and a detector. The oscillator component is configured to generate a primary oscillator signal based on a predetermined frequency of a plurality of channels and to generate a plurality of local oscillator (LO) signals from the primary oscillator signal based on the plurality of channels. The mixing component is configured to generate a plurality of mixed signals based on signal components from a received signal and the plurality of LO signals and to combine the mixed signals into a combined signal. The channel select filter is configured to filter the combined signal based on the plurality of channels and provide a filtered output signal, wherein the filtered output signal substantially comprises signals from the plurality of channels. The detector is configured to concurrently scan the plurality of channels to detect a presence of a signal within the filtered output signal of the plurality of channels.

Example 13 includes the subject matter of Example 12, including or omitting optional elements, where the components include an in phase component.

Example 14 includes the subject matter of any of Examples 12-13, including or omitting optional elements, where the arrangement includes a multi-frequency mixer configured to combine the plurality of LO signals into a single multi-frequency LO signal.

Example 15 includes the subject matter of any of Examples 12-14, including or omitting optional elements, where the one or more mixers utilizes the single multi-frequency LO signal.

Example 16 includes the subject matter of any of Examples 12-15, including or omitting optional elements, where the predetermined frequency is a multiple of a highest frequency of the plurality of channels.

Example 17 is a method of concurrently scanning a plurality of channels. The method includes receiving a signal using a plurality of channels; generating quadrature and in phase components from the received signal; mixing the quadrature component with one or more local oscillator signals to generate one or more mixed quadrature signals; mixing the in phase component with the one or more local oscillator signals to generate one or more mixed in phase signals; combining the one or more mixed quadrature signals into a folded quadrature signal; combining the one or more mixed in phase signals into a folded in phase signal; and combining the folded quadrature signal and the folded in phase signal into a folded signal.

Example 18 includes the subject matter of Example 17, including or omitting optional elements, where the method further includes detecting a valid signal within the folded signal.

Example 19 includes the subject matter of any of Examples 17-18, including or omitting optional elements, where the method further includes generating an event in response to detecting the valid signal.

Example 20 includes the subject matter of any of Examples 17-19, including or omitting optional elements, where the one or more LO signals is a single multi-frequency LO signal.

Example 21 is an arrangement for concurrently scanning a plurality of channels. The arrangement includes a means for generating components from a received signal, wherein the received signal includes a plurality of channels, a means for mixing and downconverting the components into mixed signals using a plurality of local oscillator (LO) signals, and a means for combining the mixed signals into a folded signal.

Example 22 includes the subject matter of Example 21, including or omitting optional elements, where the arrangement further includes a means for detecting a signal on one of the plurality of channels from the folded signal.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An arrangement for concurrent scanning of a plurality of channels, the arrangement comprising:
    a generator configured to generate one or more components from a received signal, wherein the received signal comprises the plurality of channels;
    a mixer configured to mix the one or more components into a folded signal based on a plurality of local oscillator (LO) signals; and
    a detector configured to concurrently scan the plurality of channels to detect a signal within the folded signal based on a predetermined set of criteria and to initiate a response based on the detected signal.

2. The arrangement of claim 1, further comprising a LO signal generator configured to generate the plurality of LO signals based on the plurality of channels.

3. The arrangement of claim 2, wherein the plurality of channels include Bluetooth low energy (BLE) and Zigbee (ZB).

4. The arrangement of claim 1, wherein the mixer includes four pairs of mixers, each pair configured to utilize one of the plurality of LO signals.

5. The arrangement of claim 1, wherein the arrangement includes a low noise amplifier configured to amplifier the received signal and provide the received signal to the generator component.

6. The arrangement of claim 1, wherein the generator is a quadrature generator.

7. The arrangement of claim 1, wherein the mixer is configured to generate a plurality of mixed signals using the plurality of LO signals to downconvert the one or more components.

8. The arrangement of claim 7, wherein the mixer includes a summation component configured to fold the plurality of mixed signals into the folded signal.

9. The arrangement of claim 1, wherein the plurality of LO signals are combined into a single, multi-frequency LO signal.

10. The arrangement of claim 1, wherein the detector includes an address correlator configured to identify a valid signal and associated address from the folded signal, wherein the valid signal is the detected signal.

11. The arrangement of claim 1, wherein the detector includes a preamble detector configured to identify a valid signal based on a detected preamble of the folded signal, wherein the valid signal is the detected signal.

12. An apparatus comprising:
    an oscillator configured to generate a primary oscillator signal based on a predetermined frequency of a plurality of channels and to generate a plurality of local oscillator (LO) signals from the primary oscillator signal based on the plurality of channels, wherein the predetermined frequency is a multiple of a highest frequency of the plurality of channels;
    a mixer configured to generate a plurality of mixed signals based on signal components from a received signal and the plurality of LO signals and to combine the mixed signals into a combined signal;
    a channel select filter configured to filter the combined signal based on the plurality of channels and provide a filtered output signal, wherein the filtered output signal comprises signals from the plurality of channels; and
    a detector configured to concurrently scan the plurality of channels to detect a presence of a signal within the filtered output signal of the plurality of channels.

13. The apparatus of claim 12, wherein the signal components include an in phase component.

14. The apparatus of claim 12, further comprising a multi-frequency mixer configured to combine the plurality of LO signals into a single multi-frequency LO signal.

15. The apparatus of claim 14, wherein the mixer utilizes the single multi-frequency LO signal.

16. A method of concurrently scanning a plurality of channels, the method comprising:
    receiving a signal using a plurality of channels;
    generating quadrature and in phase components from the received signal;
    mixing the quadrature component with one or more local oscillator signals to generate one or more mixed quadrature signals;
    mixing the in phase component with the one or more local oscillator signals to generate one or more mixed in phase signals;
    combining the one or more mixed quadrature signals into a folded quadrature signal;
    combining the one or more mixed in phase signals into a folded in phase signal;
    combining the folded quadrature signal and the folded in phase signal into a folded signal; and
    detecting a signal within the folded signal based on a predetermined set of criteria.

17. The method of claim 16, further comprising detecting a valid signal within the folded signal, wherein the valid signal is the detected signal.

18. The method of claim 17, further comprising generating an event in response to detecting the valid signal.

19. The method of claim 16, wherein the one or more LO signals is a single multi-frequency LO signal.

20. The arrangement of claim 1, wherein the criteria is channel strength.

* * * * *